Nov. 13, 1928.
J. B. MATTINGLY
1,691,775
DEVICE FOR SECURING TOGETHER PIECES OF MATERIAL
Filed Oct. 15, 1924     2 Sheets-Sheet 1
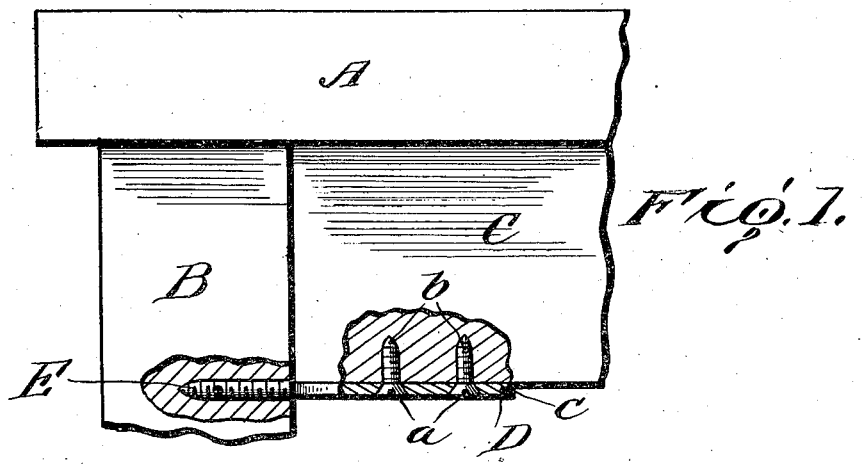
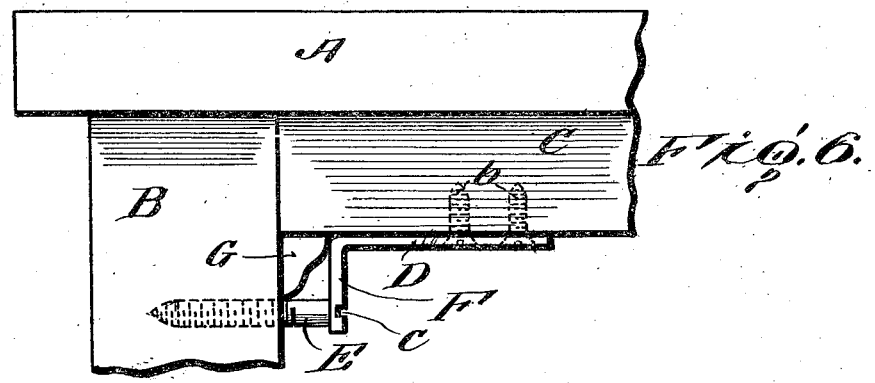
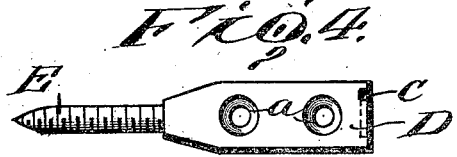
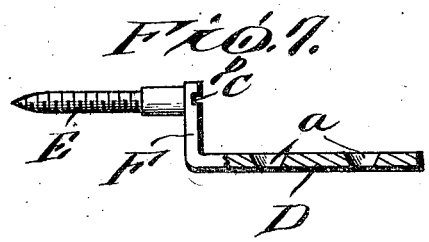
Inventor
Julia B. Mattingly
By Sturtevant & Mason
Attorneys Nov. 13, 1928.
J. B. MATTINGLY
1,691,775
DEVICE FOR SECURING TOGETHER PIECES OF MATERIAL
Filed Oct. 15, 1924  2 Sheets-Sheet 2
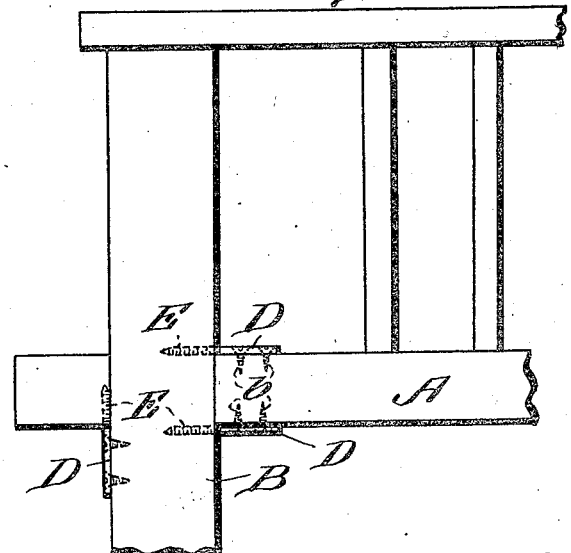
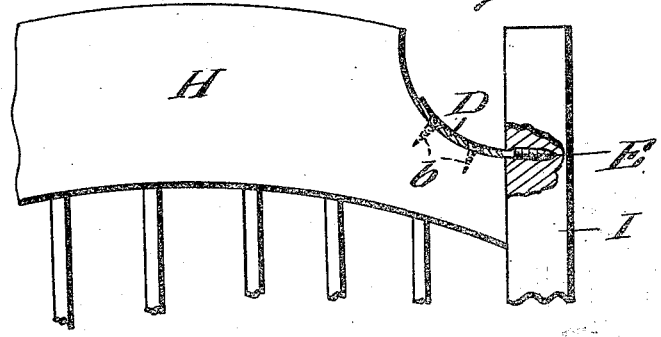
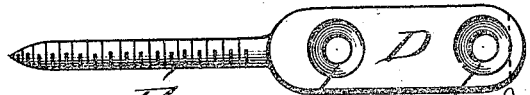
Inventor
Julius B. Mattingly
By Sturtevant & Mason
Attorneys Patented Nov. 13, 1928.

1,691,775

UNITED STATES PATENT OFFICE.

JULIA B. MATTINGLY, OF WASHINGTON, DISTRICT OF COLUMBIA.

DEVICE FOR SECURING TOGETHER PIECES OF MATERIAL.

Application filed October 15, 1924. Serial No. 743,761.

The present invention relates to an improvement in devices for use in securing two pieces of material together, and is designed particularly as a screw bracket or plate adapted to enter one piece of material and be secured transversely to another piece. It is especially useful in the manufacture or repair of furniture, such as chairs, tables, desks, or the like, or of carriages and wagons, or in any position where two pieces of material running transversely to each other are to be secured together.

In the drawings, I have shown various forms of the screw bracket or plate, and various adaptations of its use, but it will be understood that these are only given as examples, as many other uses for the device may be found and its form may be changed to make it conform to the particular position in which it is desired to use it.

In brief, the invention consists in a bracket or plate adapted to be secured by means of screws passing through its flat face to a piece of material, and having a screw threaded shank whereby it may be bodily screwed into the material to which the first material is to be attached.

It also consists in providing that part of the plate portion which lies against the material substantially flush with the outer edge of the screw threads of the shank, which lie on that face of the plate portion, whereby a neat and close fit may result without strain upon the materials.

It also consists in providing the plate portion with means for the attachment of a screw driver, whereby it may be bodily screwed into the body piece of material.

Hereafter in the specification, I have referred to the piece of material into which the screw shank of the plate or bracket enters, as the body material or supporting piece, and the material to which the flat portion of the bracket or plate is secured as the material to be supported.

The invention is illustrated in the accompanying drawings, in which—

Figure 1 is an elevation partly in section showing the application of one form of my invention to the construction of chairs of one type;

Fig. 2 is a similar view showing its application to chairs of another type;

Figs. 3, 4 and 5, are, respectively, sectional, plan, and edge views of the form of my invention illustrated in practical application in Figs. 1 and 2;

Fig. 6 is a view similar to Fig. 1, illustrating a practical application of another form of my invention;

Figs. 7 and 8 are sectional and end views of the form of device shown practically applied in Fig. 6;

Fig. 9 is an elevation, partly in section, of the top portion of a chair showing a practical application of another form of my invention;

Fig. 10 is a sectional side view of the screw plate or bracket shown practically applied in Fig. 9;

Figs. 11 and 12 are, respectively, side and plan views of a larger screw plate or bracket adapted for heavier work.

Referring now to the invention shown in Fig. 1 of the drawings, A represents the edge of a chair seat, B the leg and C the brace upon which the chair seat rests. In order to brace the leg, I employ a flat portion D, having openings $a$, $a$, through which screws $b$, $b$, may be screwed into the under face of the seat support C. This flat plate has a screw threaded shank E, adapted to be screwed into the leg B, this screw threaded shank being inserted into the leg, and the brace then being screwed to the flat plate. The end of the flat plate has a kerf $c$ in its end adapted to receive a screw driver. If desired, the flat plate may be countersunk in the brace C, and thus entirely hidden from sight.

Preferably, the upper face of the flat plate is substantially flush with the upper edge of the screw threads, thus enabling the brace to rest firmly on the top of the flat plate, without causing strain on the pieces of material.

Figure 2 illustrates the application to the well-known Morris chair, in which several braces are attached.

In Figures 6, 7 and 8 another form of device is shown in which the flat plate D is offset from the shank E, the flat plate being bent to form the angle plate F and the kerf $c$ for the screw driver being provided in the angle plate.

This form is shown as applied in Figure 6 to a chair in which an ornamental beading G, in the corner between the base and leg, is used.

Figs. 9 and 10 illustrate another form of my invention in which the plate D is bent to conform to the shape of the top H of a chain, which top is to be secured to the side I.

Figs. 11 and 12 illustrate a larger and stronger construction of screw plate or bracket, designed to be used in heavier work, such as the manufacture of carriages, wagons and for other purposes.

The great advantage of this is that it dispenses with the unsightly angle brackets and presents in one device an arrangement self securing in the body material, and having a flat supporting portion for the part to be supported, and substantially flush with the upper edge of the screw threads on the shank.

As above stated, the forms of invention as also the practical applications illustrated and described are shown only as instances and various modifications and changes may be made without departing from the invention.

Having thus described the invention, what I claim as new and desire to secure by Letters Patent is:

1. A bracket of the character described comprising a body portion having openings therein for the reception of securing means, and a screw threaded shank carried thereby parallel therewith, said body portion having a kerf for the reception of a screw driver.

2. A bracket of the character described comprising a flat body portion having openings therein for the reception of securing means, and having at one end the laterally turned portion extending at right angles thereto and provided with a kerf on its outer face, and a screw threaded shank carried by the opposite face and extending parallel with the body portion.

In testimony whereof, I affix my signature.

JULIA B. MATTINGLY.